Patented Aug. 20, 1940

2,211,752

UNITED STATES PATENT OFFICE 2,211,752

DISAZO DYESTUFFS AND THEIR MANUFACTURE

Markus Kappeler, Basel, Switzerland, assignor to Sandoz Ltd., Basel, Switzerland No Drawing. Application March 7, 1938, Serial No. 194,520. In Switzerland March 8, 1937

4 Claims. (Cl. 260—152)

I have found that new valuable disazo dyestuffs can be obtained if the tetrazocompounds of the 4:4′-diamino-diaryl-3:3′-disulphonic acids are coupled with 2-amino-8-naphthol-6-sulphonic acid, 2-alkylamino-8-naphthol-6-sulphonic acid and 2-vic-dialkylarylamino-8-naphthol-6-sulphonic acid under such conditions that the azo groups enter in ortho position to the amino groups. The process can also be performed by coupling the said tetrazocompounds with the arylsulphoylderivatives of the said coupling components and splitting off the arylsulphonic acid radicals from the disazo dyestuffs.

As diaminodiaryldisulphonic acids for the manufacture of the new dyestuffs the following compounds may for example be cited: the 4:4′-diamino-diphenyl-3:3′-disulphonic acid, the 4:4′-diamino-5:5′-dimethyldiphenyl-3:3′-disulphonic acid, the 4:4′-diamino-5:5′-dichlorodiphenyl-3:3′-disulphonic acid, the 4:4′-diaminodiphenyl-6:6′-sulphone-3:3′-disulphonic acid (2:7-diaminodiphenylene-sulphone-3:6′-disulphonic acid), the 4:4′-diamino-6:6′-dimethyldiphenyl-3:3′-disulphonic acid and the 4:4′-diamino-6:6′-dichlorodiphenyl-3:3′-disulphonic acid.

As coupling components for such dyestuffs there may for example be used the 2-amino-8-hydroxynaphthalene-6-sulphonic acid, the 2-vic-xylylamino-8-hydroxynaphthalene-6-sulphonic acid, the 2-mesidylamino-8-hydroxynaphthalene-6-sulphonic acid or the arylsulphonic acid esters of these compounds. Advantageously, the coupling of the tetrazo-compounds with the said azo components is effected according to known methods in acid or neutral solution in presence of sodium formate, sodium acetate or by cautious addition of carbonate of lime or magnesium carbonate. Further it has been observed that this coupling can also be performed with advantage in presence of sulphocyanates, xanthogenates or thiosulphates.

The dyestuffs thus obtained are represented by the following general formula:

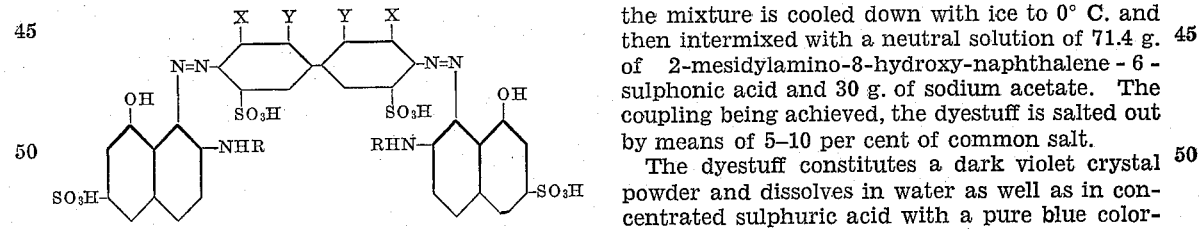

wherein X stands for one of the group consisting of hydrogen, alkyl and halogen, Y stands for one of the group consisting of hydrogen, alkyl and halogen, or represents a SO₂-bridge, and R stands for one of the group consisting of hydrogen, alkyl and phenyl. They are particularly convenient for dyeing animal fibres, especially wool and hair, and distinguish themselves by a very good fastness to acid milling and a mostly good fastness to light.

The following examples illustrate the invention.

Example 1

A solution of 38.8 g. of benzidine-3:3′-disulphonate of sodium and 13.8 g. of sodium nitrite in 400 cc. of water are allowed to flow for tetrazotation, while stirring, into a mixture of 300 cc. of water and 60 g. of concentrated hydrochloric acid. When tetrazotation is achieved, the mineral acid is neutralized by means of sodium acetate or sodium carbonate. Thereupon the mixture is cooled down with ice to 0° C. and then intermixed successively with 50 g. of sodiumthiosulphate, 30 g. of sodium acetate and a neutral solution of 48 g. of 2-amino-8-hydroxynaphthalene-6-sulphonic acid. The coupling begins immediately and in the course of one hour the separated tetrazo compound disappears. To achieve the coupling there is still stirred during some hours.

The obtained dyestuff, which crystallizes out in form of fine, dark violet needles, is completely separated by addition of 10 per cent of common salt and then isolated by filtration. It dyes wools and hair a violet shade very fast to light and acid milling.

Example 2

A solution of 38.8 g. of benzidine-3:3′-disulphonate of sodium and 13.8 g. of sodium nitrite in 400 cc. of water is allowed to flow for tetrazotation, while stirring, into a mixture of 300 cc. of water and 60 g. of concentrated hydrochloric acid. When tetrazotation is completed the mineral acid is neutralized with sodium acetate. Thereupon the mixture is cooled down with ice to 0° C. and then intermixed with a neutral solution of 71.4 g. of 2-mesidylamino-8-hydroxy-naphthalene-6-sulphonic acid and 30 g. of sodium acetate. The coupling being achieved, the dyestuff is salted out by means of 5–10 per cent of common salt.

The dyestuff constitutes a dark violet crystal powder and dissolves in water as well as in concentrated sulphuric acid with a pure blue coloration. It dyes wool and hair a blue remarkably fast to acid milling and fairly fast to light.

Example 3

40.6 g. of 2:7-diaminodiphenylenesulphone-3:6-disulphonic acid are tetrazotized in the usual manner with 15 g. of sodium nitrite and 60 g. of concentrated hydrochloric acid. The obtained suspension of the weakly yellowish tetrazo compound is then allowed to flow, while stirring, into a neutral, ice cooled solution of 48 g. of 2-amino-8-hydroxy-naphthalene-6-sulphonic acid, 30 g. of sodium acetate and 30 g. of sodium thiosulphate. There is immediately formed a deep blue solution from which the disazodyestuff crystallizes out for its greatest part. The coupling being achieved, the dyestuff is completely precipitated out by addition of a little common salt and then filtered off. The dyestuff is identical with the coupling product of Example 5.

Example 4

40.6 g. of 2:7-diaminodiphenylenesulphone-3:6-disulphonic acid are as sodium salt dissolved, together with 6.9 g. of sodium nitrite, in 500 cc. of water. This solution is allowed to flow, while stirring, into a well cooled mixture of 200 cc. of water and 50 cc. of concentrated hydrochloric acid. There is precipitated the difficultly soluble monodiazocompound of the 2:7-diaminodiphenylenesulphone-3:6-disulphonic acid in form of well formed yellow-brown prisms. The obtained suspension is then intermixed with 30 g. of sodium acetate and a neutral solution of 24 g. of 2-amino-8-hydroxynaphthalene-6-sulphonic acid. The coupling is performed within several hours and the monoazodyestuff precipitates out almost completely in form of fine, small, violet needles. The coupling being fully achieved, the monoazodyestuff, if desired after previous filtration, is mixed with 6.9 g. of sodium nitrite and diazotized by addition of the necessary quantity of acetic acid, formic acid or mineral acid. There is formed a deep blue solution to which is added after some time a neutral solution of 24 g. of 2-amino-8-hydroxy-naphthalene-6-sulphonic acid, said solution having been intermixed with an excess of sodium acetate. The coupling yields a blue disazo dyestuff which is identical to the product obtained according to Example 5.

Example 5

40.6 g. of 2:7-diaminodiphenylenesulphone-3:6-disulphonic acid are tetrazotized in the usual manner with 15 g. of sodium nitrite and 60 g. of concentrated hydrochloric acid and the obtained tetrazocompound is coupled in presence of sodium acetate with 78.6 g. of the toluene-sulphonic acid ester of the 2-amino-8-hydroxynaphthalene-6-sulphonic acid. The violet disazo dyestuff thus obtained is filtered off, dried and poured into ten times the quantity of concentrated sulphuric acid. By cautious addition of water the temperature is then increased to 75° to 80° C., whereby the dyestuff is caused to dissolve under splitting off of the toluenesulphonic acid radicals. The saponification being achieved, the sulphuric acid solution is poured into a mixture of water and ice and the separated disazo dyestuff is isolated.

The disazo dyestuff crystalizes out in form of fine, small, blue needles, dissolves in water with pure blue coloration and in concentrated sulphuric acid with violet-red coloration and dyes wool and hair a blue very fast to acid milling and fast to light.

What I claim is:

1. Azo dyestuffs of the general formula

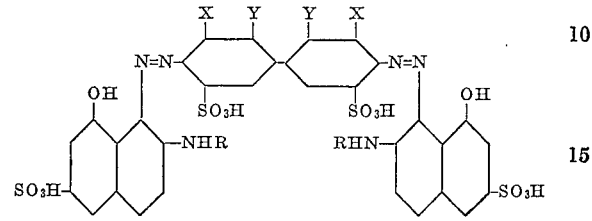

wherein X stands for one of the group consisting of hydrogen, alkyl and halogen, Y stands for one of the group consisting of hydrogen, alkyl and halogen, or represents a $SO_2$-bridge, and R stands for one of the group consisting of hydrogen, alkyl and phenyl, said dyestuffs dyeing animal fibres red, violet and blue shades of excellent fastness to acid milling and light.

2. The azo dyestuff of the formula

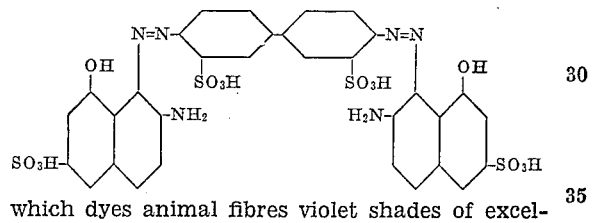

which dyes animal fibres violet shades of excellent fastness to acid milling and light.

3. The azo dyestuff of the formula

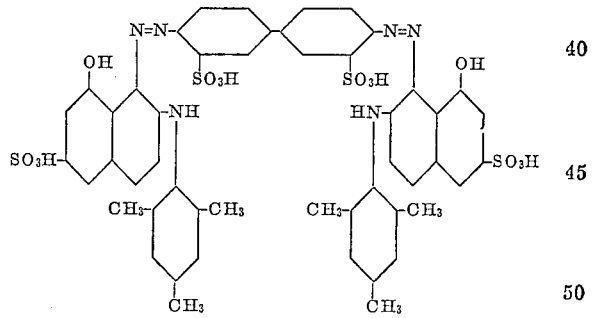

which dyes animal fibres blue shades of excellent fastness to acid milling and light.

4. The azo dyestuff of the formula

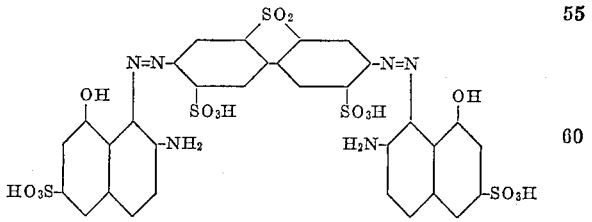

which dyes animal fibres in blue shades of excellent fastness to acid milling and light.

MARKUS KAPPELER.